United States Patent
Veazey (10) Patent No.: US 6,879,270 B1
(45) Date of Patent: Apr. 12, 2005

(54) DATA COMPRESSION IN MULTIPROCESSOR COMPUTERS

(75) Inventor: Judson E. Veazey, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/644,282

(22) Filed: Aug. 20, 2003

(51) Int. Cl.[7] .................................... H03M 7/40
(52) U.S. Cl. ............................. 341/87; 341/51
(58) Field of Search .......................... 341/50, 51, 87

(56) References Cited

U.S. PATENT DOCUMENTS

| | | |
|---|---|---|
| 4,494,108 A | 1/1985 | Langdon |
| 4,558,302 A | 12/1985 | Welch |
| 4,586,027 A | 4/1986 | Tsukiyama |
| 4,622,545 A | 11/1986 | Atkinson |
| 4,701,745 A | 10/1987 | Waterworth |
| 4,814,746 A | 3/1989 | Miller |
| 4,905,297 A | 2/1990 | Langdon |
| 4,906,991 A | 3/1990 | Fiala |
| 4,943,869 A | 7/1990 | Horikawa |
| 4,988,998 A | 1/1991 | O'Brien |
| 5,049,881 A | 9/1991 | Gibson |
| 5,051,745 A | 9/1991 | Katz |
| 5,710,909 A * | 1/1998 | Brown et al. ............... 711/170 |
| 5,737,638 A * | 4/1998 | Byrn et al. .................... 710/68 |
| 6,094,710 A | 7/2000 | Arimilli |
| 6,208,273 B1 * | 3/2001 | Dye et al. ..................... 341/51 |
| 2002/0083299 A1 | 6/2002 | Van Huben |
| 2002/0087828 A1 | 7/2002 | Arimilli |
| 2002/0105972 A1 * | 8/2002 | Richter et al. .............. 370/474 |
| 2002/0147785 A1 | 10/2002 | Venkatsubramanian |

OTHER PUBLICATIONS

Dr. Kamran Sayrafian, Overview of Switch Fabric Architectures, Jul. 2002, Zagros Networks, 13 pgs.
Jean–Loup Gailly, comp.compression Frequently Asked Questions (part 1/3), Sep. 1999, 69 pgs.
Jean–Loup Gailly, comp.compression Frequently Asked Questions (part 2/3), Sep. 1999, 42 pgs.
Jean–Loup Gailly, comp.compression Frequently Asked Questions (part 3/3), Sep. 1999, 13 pgs.
Bruce McCormick, Symmetric Multiprocessing (SMP), Sep. 1997, 4 pgs.
Curt Schimmel, UNIX Systems for Modern Architectures: Symmetric Multiprocessing and Caching for Kernel Programmers, Chapter 8, 1994, 26 pgs.

* cited by examiner

Primary Examiner—Howard L. Williams (57) ABSTRACT

A compression/decompression (codec) engine is provided for use in conjunction with a fabric agent chip in a multiprocessor computer system. The fabric agent chip serves as an interface between a first memory controller on a first cell board in the computer system and other memory controllers on other cell boards in the computer system. Cell boards in the computer system are interconnected by a system fabric. Memory data read by the first memory controller is compressed by the codec engine prior to being transmitted over the system fabric by the fabric agent chip. Conversely, memory data received over the system fabric by the fabric agent chip is decompressed by the codec engine prior to being provided to the first memory controller. Other fabric agent chips in the computer system may similarly be provided with corresponding codec engines.

26 Claims, 7 Drawing Sheets

DATA COMPRESSION IN MULTIPROCESSOR COMPUTERS

BACKGROUND

1. Field of the Invention

The present invention relates to multiprocessor computer systems and, more particularly, to techniques for increasing the bandwidth of intra-system data transmission in multiprocessor computer systems.

2. Related Art

Early computers each had a single processor, referred to as the central processing unit (CPU), that executed all software on the computer and otherwise controlled the computer's operation. The speed at which a computer could operate was therefore limited by the speed of the fastest individual processors available at any particular time.

Subsequently, computers were developed that could incorporate multiple processors. A single multiprocessor computer (MP) can use its multiple processors to perform operations in parallel, thereby achieving aggregate processing speeds greater than that of a single processor. Multiprocessor computers therefore can overcome, to a certain extent, the processing speed limitations imposed by the current state of the processor art. A single high-end server may include, for example, 1, 2, 4, 8, or 16 interconnected processors operating in parallel. Advances in multiprocessing technology will likely continue to increase the number of processors that may be interconnected within a single MP.

Figure 1:
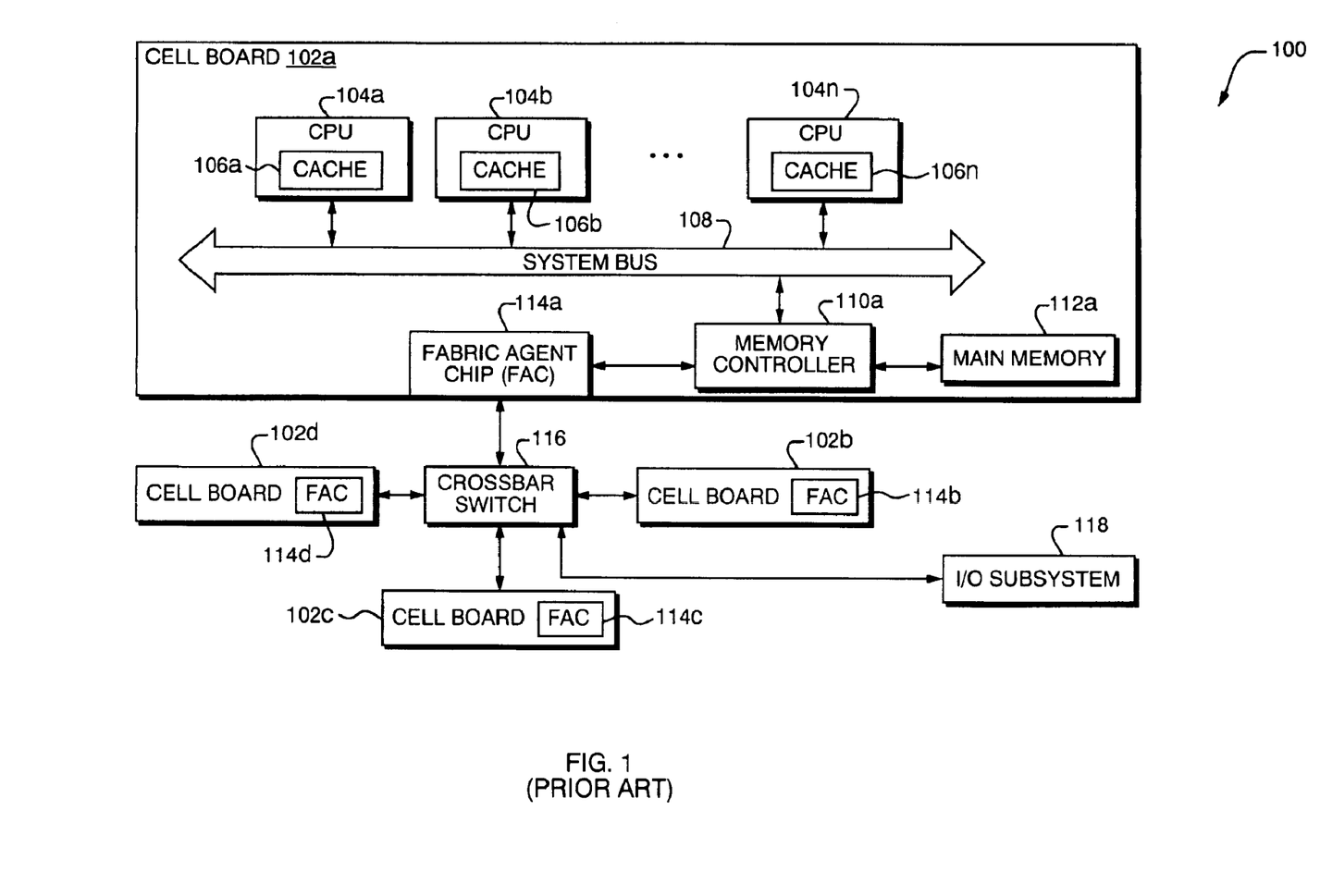
FIG. 1 is a block diagram of a prior art computer system having a symmetric multiprocessing (SMP) architecture.

Although there are a variety of multiprocessor computer architectures, the symmetric multiprocessing (SMP) architecture is one of the most widely used architectures. Referring to FIG. 1, a computer system 100 having an SMP architecture is shown in block diagram form. The computer system 100 includes a plurality of cell boards 102a–d interconnected using a crossbar switch 116. Each of the cell boards 102a–d includes a plurality of CPUs, a system bus, and main memory.

For ease of illustration and explanation, the cell board 102a is shown in more detail in FIG. 1 and will now be described in more detail. The other cell boards 102b–d, however, may include components and a structure similar to that of cell board 102a. The cell board 102a includes a plurality of CPUs 104a–n, where n is a number such as 2, 4, 8, nor 16. The CPUs 104a–n include on-board caches 106a–n, respectively. The cell board 102a also includes a system bus 108, main memory 112a, and memory controller 110a. The CPUs 102a–n are coupled directly to the system bus 108, while main memory 112a is coupled to the system bus 108 through memory controller 110a. CPUs 104a–n may communicate with each other over the system bus 108 and may access the memory 112a over the system bus 108 through the memory controller 110a, as is well-known to those of ordinary skill in the art.

Although each of the cell boards 102a–d includes its own local system memory (such as memory 112a), the memories in the cell boards 102a–d may be addressed by the CPUs in the cell boards 102a–d using a single combined virtual address space. The crossbar switch 116 provides a mechanism for communication among the cell boards 102a–d to perform such shared memory access and other inter-cell board communication. In general, a crossbar switch is a device that has a number of input/output ports to which devices may be connected. A pair of devices connected to a pair of input/output ports of the crossbar switch 116 may communicate with each other over a path formed within the switch 116 connecting the pair of input/output ports. The paths set up between devices can be fixed for some duration or changed when desired. Multiple paths may be active simultaneously within the crossbar switch, thereby allowing multiple pairs of devices to communicate with each other through the crossbar switch simultaneously and without interfering with each other.

Crossbar switches may be contrasted with buses, in which there typically is a single communications channel shared by all devices. A significant advantage of crossbar switches over buses is that an increase in traffic between any two devices does not affect the traffic between other pairs of devices. Furthermore, crossbar-based architectures typically offer greater scalability than bus-based architectures.

The cell board 116 more generally is part of the "system fabric" or "switching fabric," terms which refer to those components of the computer system 100 that enable the cell boards 102a–d to communicate with each other. If, for example, there were multiple crossbar switches in the system 100, the system fabric would include all such crossbar switches.

Cell board 102a also includes a fabric agent chip 114a that is coupled to the crossbar switch 116 and which acts as an interface between the cell board 102a and the other cell boards 102b–d in the system 100. The other cell boards 102b–d similarly include their own fabric agent chips 114b–d, respectively. Fabric agent chips 114a–d may be considered to be part of the system fabric.

As described above, the local memories in the cell boards 102a–d may be accessed using a single virtual address space. In an SMP such as the system 100 shown in FIG. 1, the fabric agent chips 114a–d in cell boards 102b–d enable this global shared memory address space. For example, consider a case in which CPU 104a issues a memory access request to memory controller 110a that addresses a memory location (or range of memory locations) in the global virtual address space. If the memory controller 110a cannot satisfy the memory access request from the local memory 112a, the memory controller 110a forwards the request to the fabric agent chip 114a. The fabric agent chip 114a translates the global memory address in the request into a new memory address that specifies the location of the requested memory, and transmits a new memory access request using the new address to the crossbar switch 116. The crossbar switch 116 forwards the memory access request to the fabric agent chip in the appropriate cell board.

The requested memory access is performed using the local memory of the receiving cell board, if possible, and the results are transmitted back over the crossbar switch 116 to the fabric agent chip 114a and back through the memory controller 110a to the CPU 104a. If the memory access request cannot be satisfied using the local memory of the receiving cell board, the memory access request may be satisfied using an I/O subsystem 118 coupled to the crossbar switch 116. The I/O subsystem 118 may, for example, include one or more hard disk drives that store infrequently accessed portions of memory according to a virtual memory scheme.

The CPUs in cell boards 102a–d may thereby access the main memory in any of the other cell boards 102a–d over the crossbar switch 116 using the fabric agent chips 114a–d in the cell boards 102a–d. One goal of such a system is to make the implementation of memory access transparent to the CPUs 104a–d, in the sense that the CPUs 104a–d may transmit and receive responses to memory access requests in the same way regardless of whether such requests are satisfied from onboard memory, offboard memory, or the I/O subsystem 118.

It can be seen from FIG. 1 that all data transferred to and from the cell board 102a must pass through the fabric agent chip 114a. The bandwidth to and from the cell board 102a therefore is limited by the maximum bandwidth of the fabric agent chip 114a. Similarly, the crossbar switch 116 has a maximum bandwidth due to its particular architecture and implementation.

The bandwidth limits imposed by the fabric agent chip 114a, crossbar switch 116, and the links between the cell boards 102a–d and the crossbar switch 116 (and between the other crossbar switches, if any) do not pose any problems so long as the total bandwidth required by the CPUs 104a–n in cell board 102a does not exceed the maximum bandwidth of the fabric agent chip 114a and crossbar switch 116. As processing speed continues to double roughly every 18 months, and as the number of CPUs in each of the cell boards 102a–d increases, however, the CPUs 104a–n may perform memory access operations which require higher bandwidth than can be provided by the fabric agent chip 114a and crossbar switch 116.

One approach that has been taken to this problem is to re-engineer the crossbar switch 116 when the CPUs 104a–n are replaced with faster CPUs, or when the number of CPUs in each cell board is increased. Re-engineering the crossbar switch 116, however, is tedious, time-consuming, and costly. In particular, speeding up the links in the crossbar switch 116 may be hindered by noise or other engineering obstacles, and increasing the number of links in the crossbar switch 116 increases the size of the crossbar switch 116, causes the crossbar switch 116 to consume more power, and increases the cost of manufacturing the crossbar switch 116.

What is needed, therefore, are techniques for increasing the bandwidth of intra-system data transmission in multiprocessor computer systems.

SUMMARY

A compression/decompression (codec) engine is provided for use in conjunction with a fabric agent chip in a multiprocessor computer system. The fabric agent chip serves as an interface between a first memory controller on a first cell board in the computer system and other memory controllers on other cell boards in the computer system. Cell boards in the computer system are interconnected by a system fabric. Memory data read by the first memory controller is compressed by the codec engine prior to being transmitted over the system fabric by the fabric agent chip. Conversely, memory data received over the system fabric by the fabric agent chip is decompressed by the codec engine prior to being provided to the first memory controller. Other fabric agent chips in the computer system may similarly be provided with corresponding codec engines.

For example, in one aspect of the present invention, a computer system is provided that includes a system fabric and a plurality of cell boards connected to the system fabric, each of the plurality of cell boards including at least one microprocessor, a memory, a microcontroller coupled between the memory and the at least one microprocessor; a fabric agent chip coupled between the microcontroller and the system fabric; and a compression/decompression (codec) engine coupled between the microcontroller and the fabric agent chip. The system fabric may, for example, include one or more crossbar switches.

The codec engine in each of the plurality of cell boards may include means for compressing data transmitted by the memory controller to the fabric agent chip and means for decompressing data transmitted by the fabric agent chip to the memory controller. The codec engine may be a component of the fabric agent chip.

In another aspect of the present invention, a method is provided that includes steps of: (A) obtaining data from a first memory controller in a multiprocessor computer system; (B) compressing the data to produce compressed data; and (C) transmitting the compressed data over a system fabric in the multiprocessor computer system. The multiprocessor computer system may include a fabric agent chip that performs steps (B) and/or (C).

The method may further include steps of: (D) decompressing the compressed data to produce the data obtained from the first memory controller; and (E) providing the data obtained from the first memory controller to a second memory controller in response to a first memory read request issued by the second memory controller. The method may also perform steps such as providing the data obtained from the first memory controller to a microprocessor in response to a second memory read request issued by the microprocessor, and/or storing the data obtained from the first memory controller in a memory controlled by the second memory controller.

Other features and advantages of various aspects and embodiments of the present invention will become apparent from the following description and from the claims.

DETAILED DESCRIPTION

A compression/decompression (codec) engine is provided for use in conjunction with a fabric agent chip in a multiprocessor computer system. The fabric agent chip serves as an interface between a first memory controller on a first cell board in the computer system and other memory controllers on other cell boards in the computer system. Cell boards in the computer system are interconnected by a system fabric. Memory data read by the first memory controller is compressed by the codec engine prior to being transmitted over the system fabric by the fabric agent chip. Conversely, memory data received over the system fabric by the fabric agent chip is decompressed by the codec engine prior to being provided to the first memory controller. Other fabric agent chips in the computer system may similarly be provided with corresponding codec engines.

Figure 2:
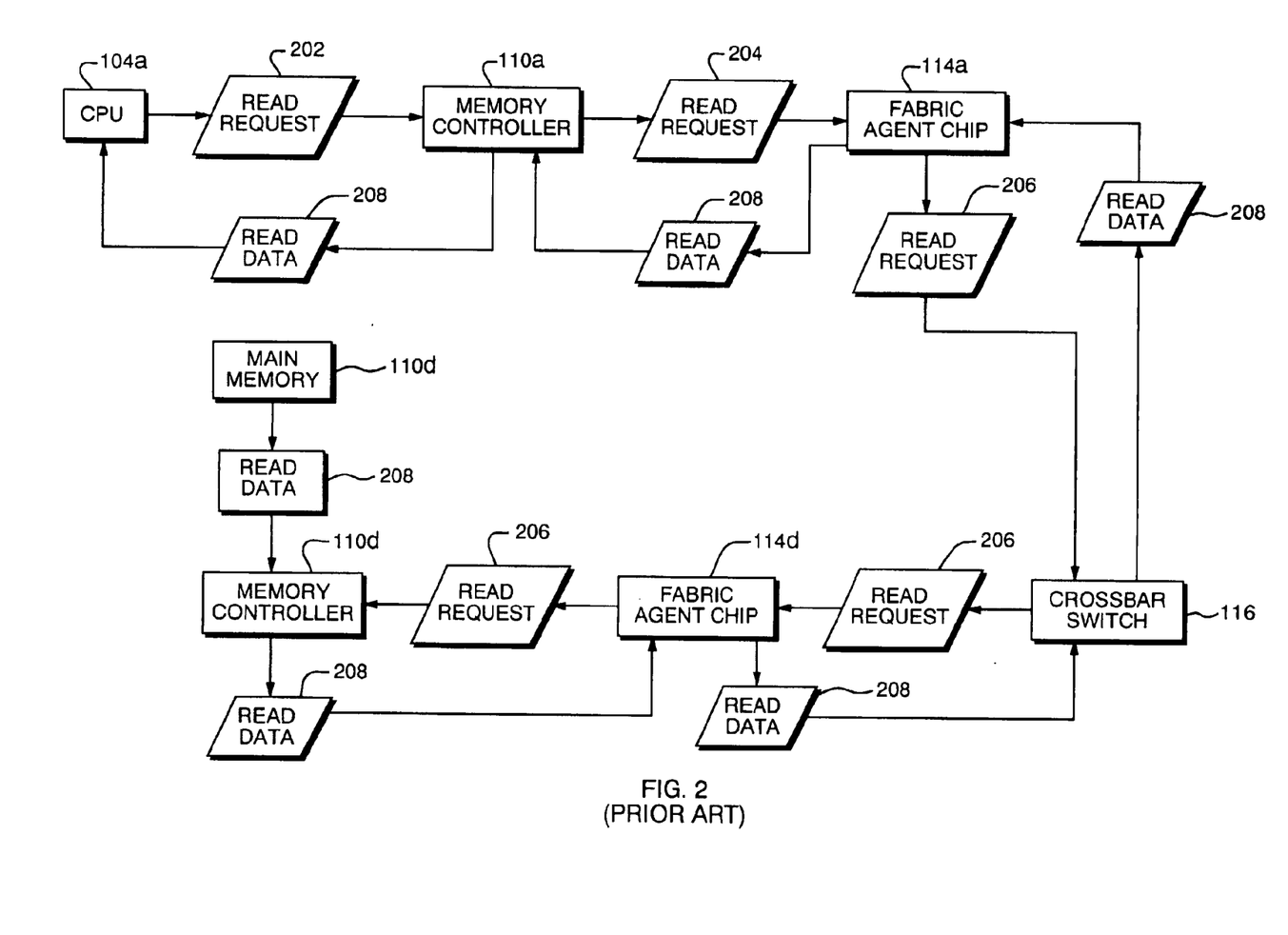
FIG. 2 is a dataflow diagram illustrating operations that may be performed by the system of FIG. 1 to perform a memory access operation.

Before describing particular embodiments of the present invention, techniques that may be used by the prior art system 100 to perform memory access will be described in more detail. Referring to FIG. 2, a dataflow diagram is shown which illustrates the operations that may be performed by the system 100 to perform a memory read operation.

In the example illustrated in FIG. 2, the CPU 104a in cell board 102a issues a memory read request 202 to the memory controller 110a over the system bus 108. The memory read request 202 specifies one or more memory addresses using a global (virtual) address space that encompasses both the memory 112a in the cell board 102a and memory (not shown) in the other cell boards 102b–d. Assume for purposes of example that the memory specified by the read request is not in the main memory 112a in cell board 102a.

Memory controller 110a receives the read request 202 and determines that the requested memory is not in the onboard memory 112a. The memory controller 110a may make this determination, for example, by reference to a table of memory address ranges that are within the onboard memory 112a. As a result, the memory controller 110a transmits a memory request 204 to the fabric agent chip 114a so that the original read request 202 may be satisfied by reading from memory in one of the other cell boards 102b–d. The read request 204 typically uses the same global memory address space as the read request 202.

In response to receiving the read request 204, the fabric agent chip 114a in the cell board 102a transmits a read request 206 to the crossbar switch 116 requesting data from the same memory addresses requested by the read request 204. The fabric agent chip 114a may, however, translate the requested memory addresses into addresses in a memory address space understood by the crossbar switch 116. The fabric agent chip 114a and the crossbar switch 116 typically are designed to communicate with each other according to a shared, predefined protocol.

In response to receiving the read request 206, the crossbar switch 116 determines which of the cell boards 102b–d should receive the read request 206, and forwards the read request 206 to the appropriate cell board. In the present example, assume that the cell board 102d includes the memory addressed by the read request 206 and that the crossbar switch 116 therefore forwards the read request 206 to cell board 102d.

Figure 3:
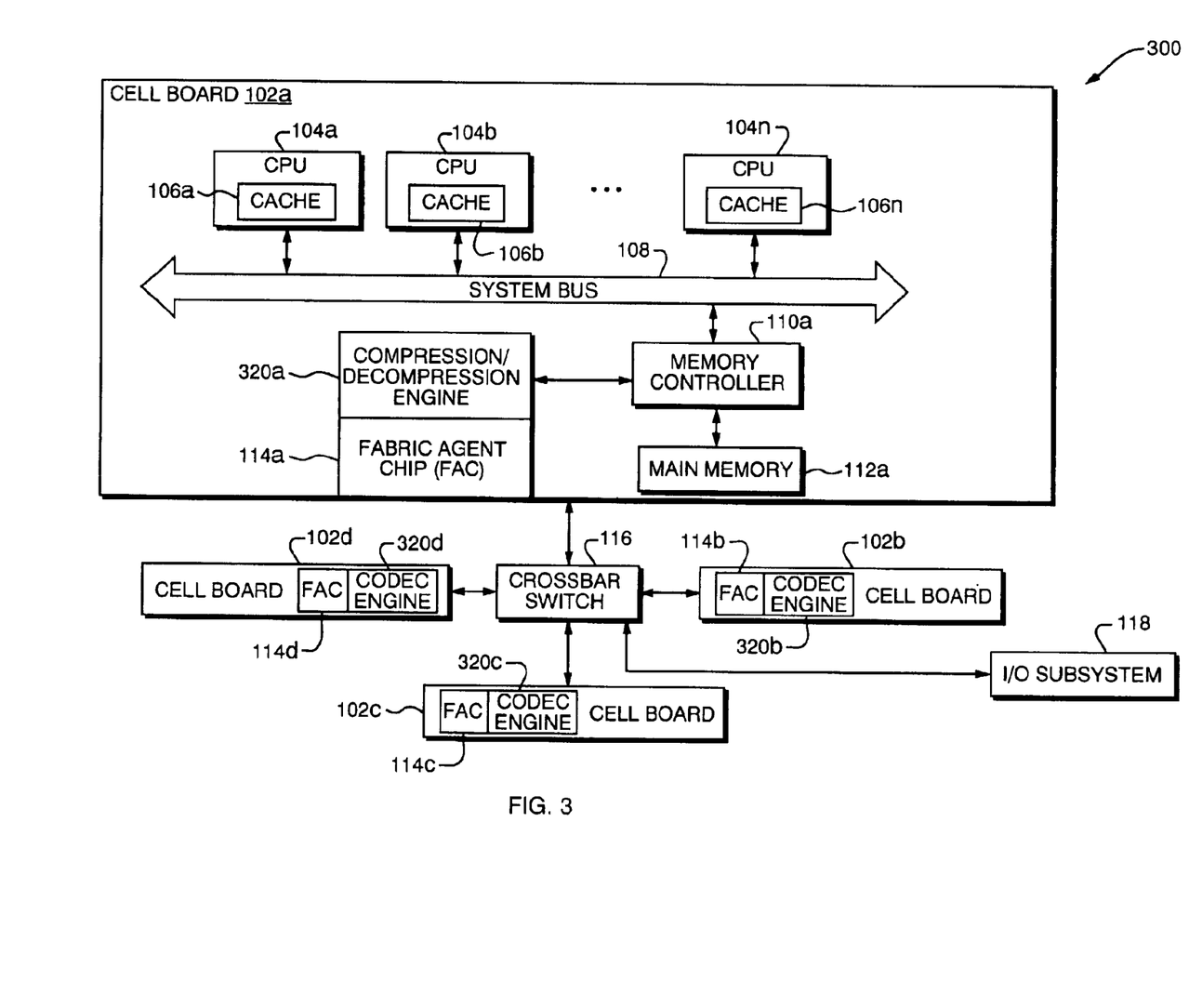
FIG. 3 is a block diagram of a multiprocessor computer system including compression/decompression (codec) engines according to one embodiment of the present invention.

As shown in FIG. 3, cell board 102d includes fabric agent chip 114d. Although not shown in FIG. 1, cell board 102d also includes main memory 110d and memory controller 110d (FIG. 2). Fabric agent chip 114d receives the read request 206 from the crossbar switch 116, translates the memory addresses in read request 206 back into addresses in the global virtual address space, and transmits an appropriate read request 208 to memory controller 110d in the cell board 102d. Memory controller 110d reads data 208 from the memory locations addressed by read request 208 in memory 112d. The read data 208 may, for example, include one or more pages of memory data.

The memory controller 10d transmits read data 208 back to the CPU 104a through the fabric agent chip 114d, crossbar switch 116, fabric agent chip 114a, and memory controller 110a. The read data 208 is thereby received by the CPU 104a in response to the initial read request 202 in a manner that is indistinguishable (from the point of view of the CPU 104a) from a read request satisfied directly from the local onboard memory 112a.

Particular embodiments of the present invention will now be described. Referring to FIG. 3, a block diagram is shown of a computer system 300 according to one embodiment of the present invention. The system 300 is a symmetric multiprocessing (SMP) computer system including some of the same components as the system 100 shown in FIG. 1. For example, the system 300 includes cell boards 102a–d, cross bar switch 116, and I/O subsystem 118.

Cell boards 102a–d in the system 300 still include fabric agent chips 114a–d. In addition, cell boards 102a–d include compression/decompression (codec) engines 320a–d. Each of the codec engines 320a–d compresses and decompresses data transmitted and received by the corresponding one of the fabric agent chips 114a–d. The operation of the codec engines 320a–d will now be described in more detail.

Figure 4A:
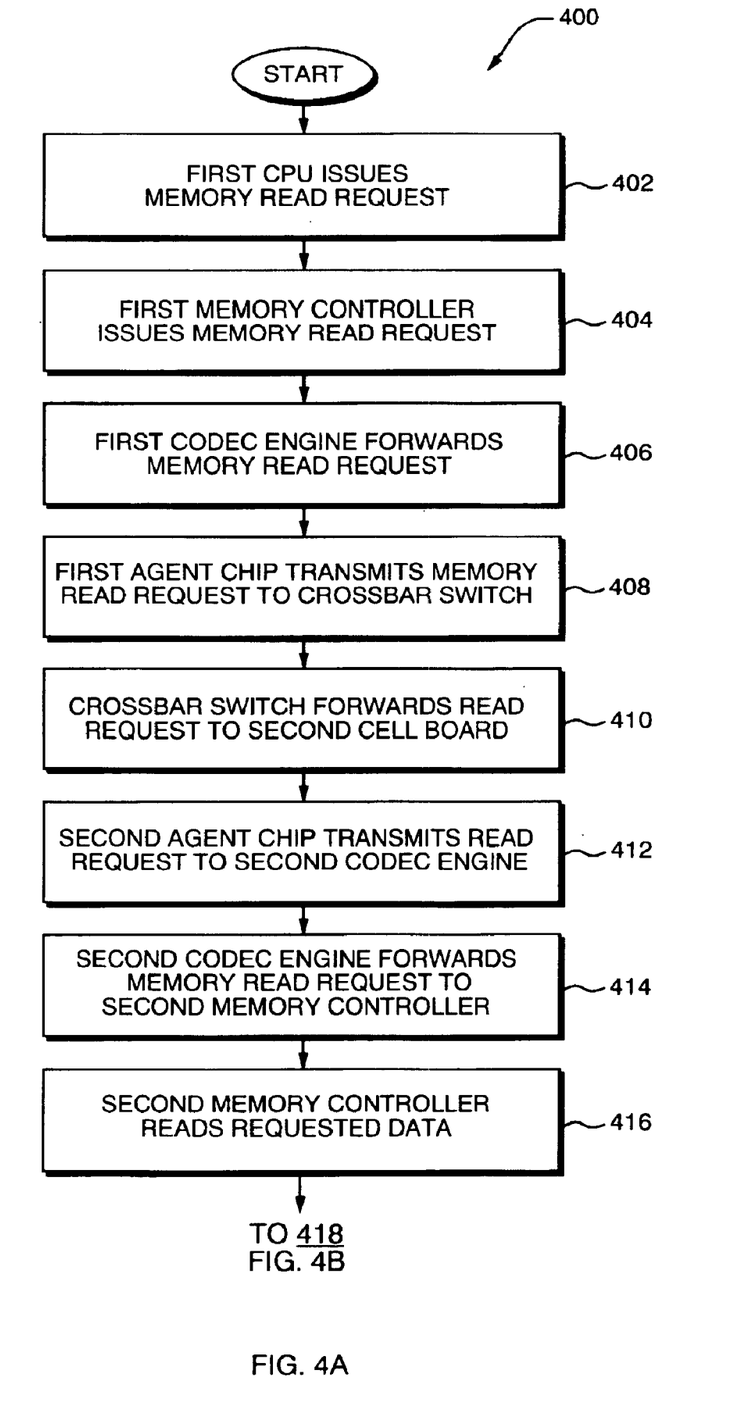
FIGS. 4A–4B are flowcharts of a method that is performed by the system of FIG. 3 to perform a memory read operation according to one embodiment of the present invention.
Figure 4B:
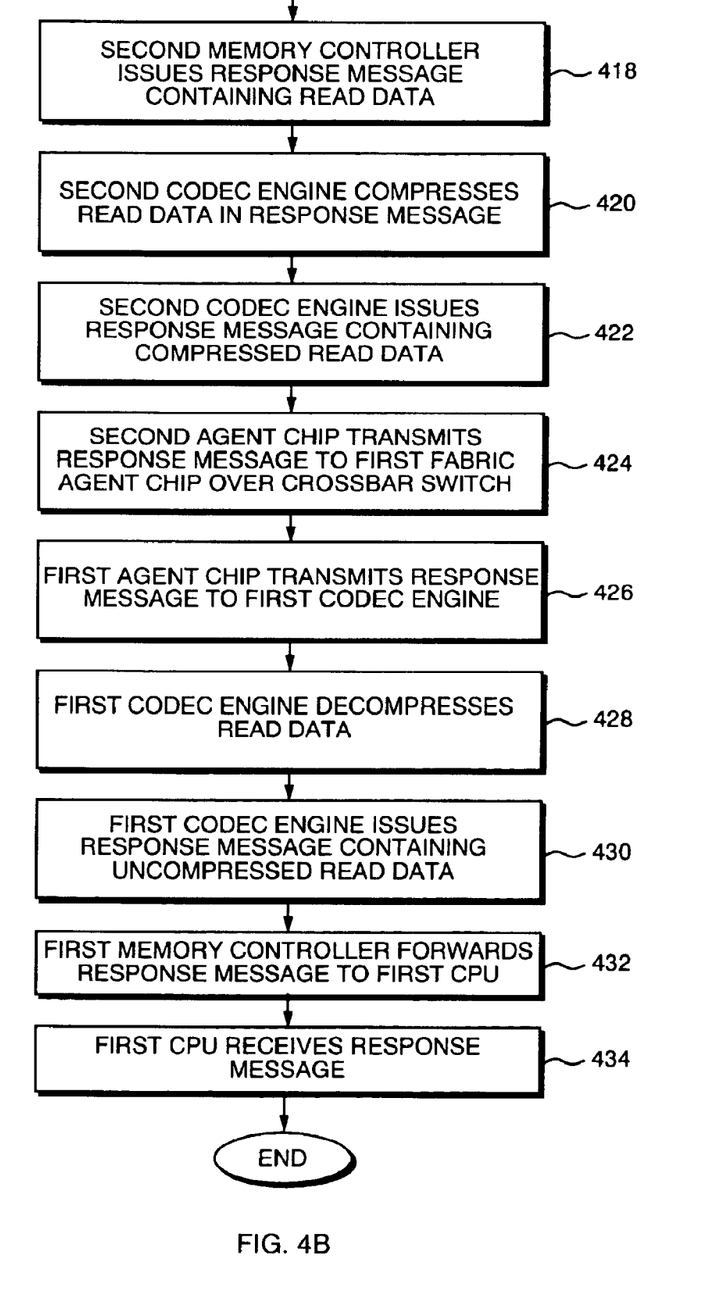
Figure 5A:
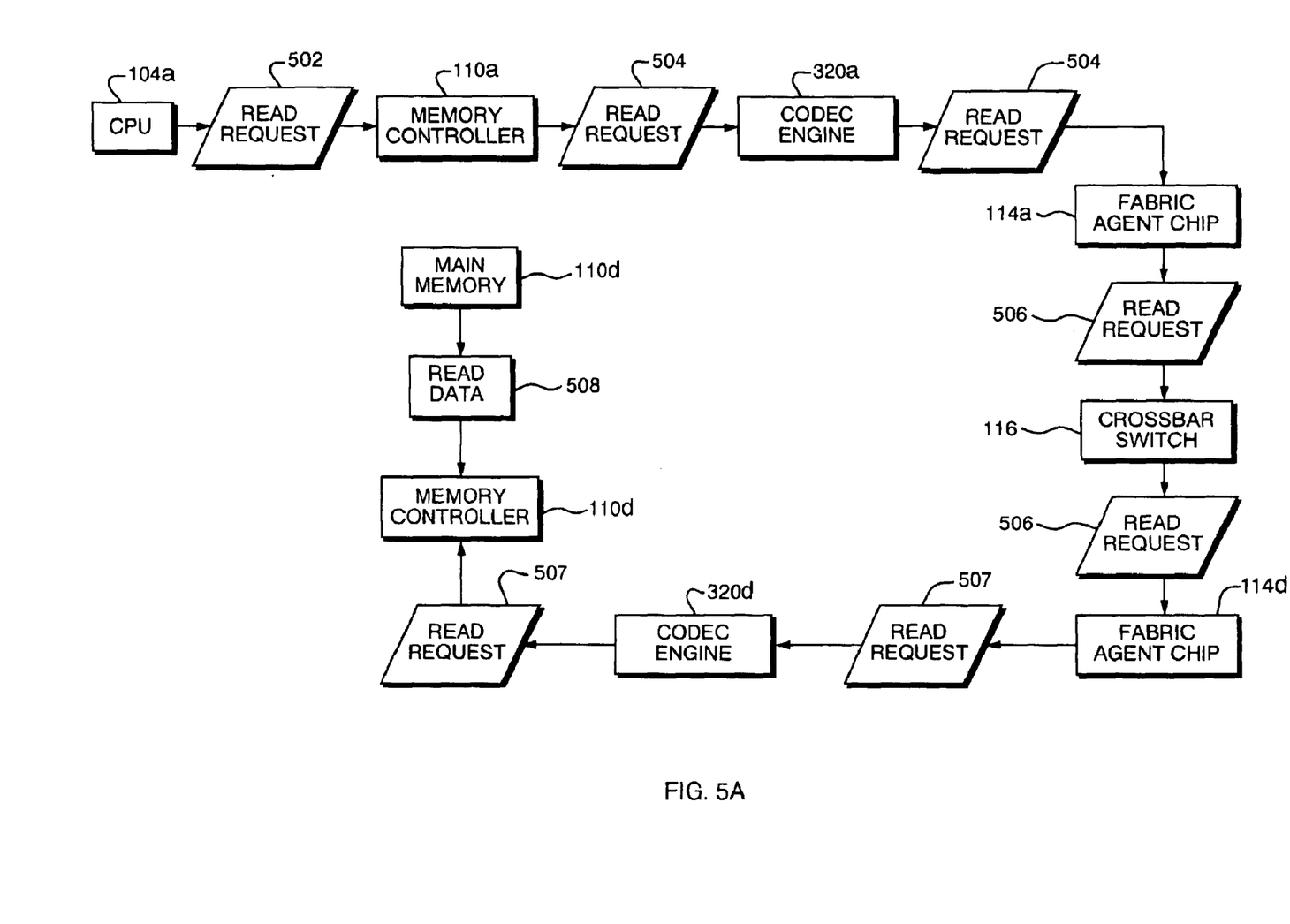
FIGS. 5A–5B are dataflow diagrams illustrating the operations performed by the method of FIGS. 4A–4B according to one embodiment of the present invention.
Figure 5B:
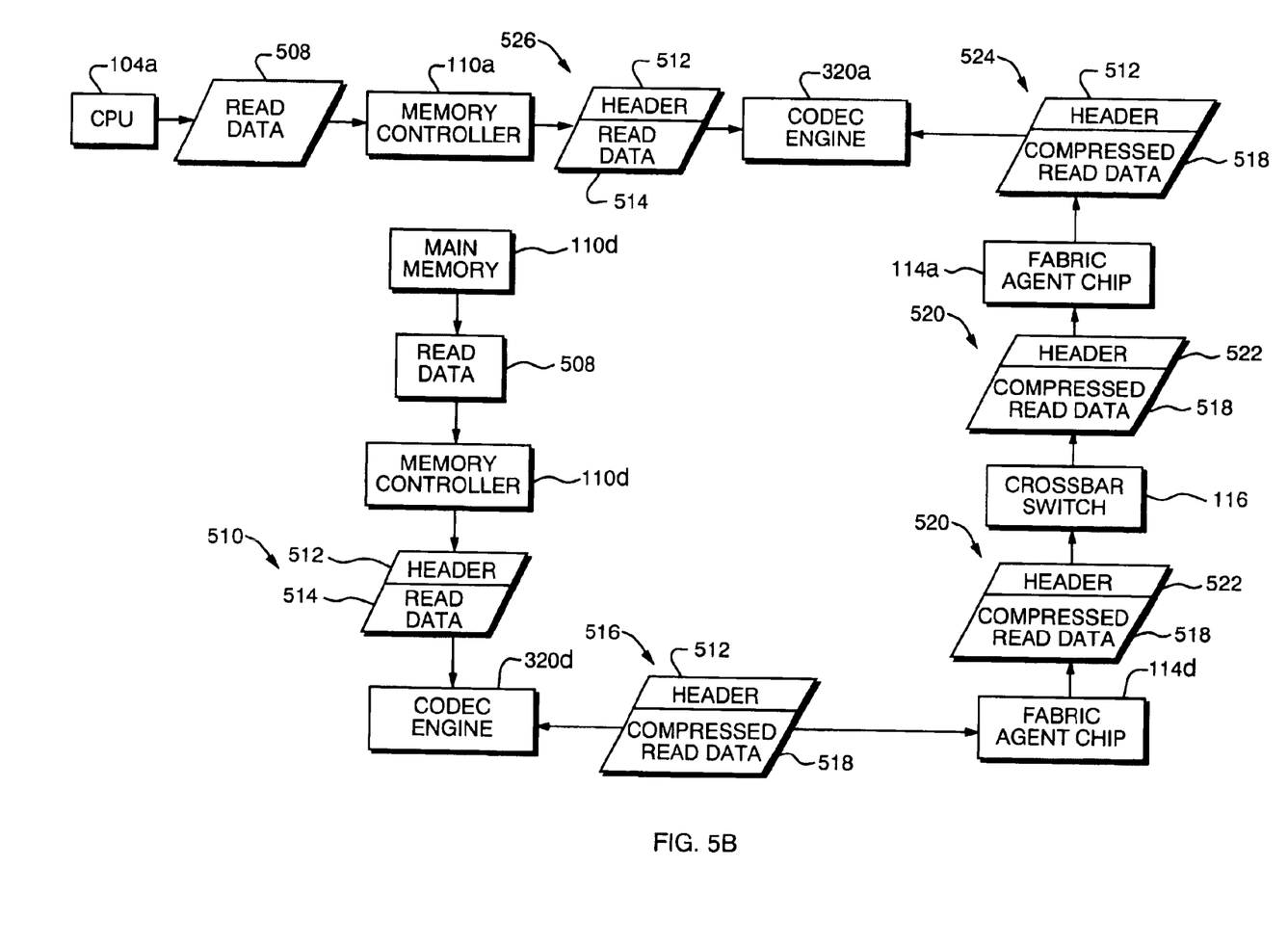

Referring to FIGS. 4A–4B, flowcharts are shown of a method 400 that is performed by the system 300 to process a memory read request according to one embodiment of the present invention. Referring to FIGS. 5A–5B, dataflow diagrams are shown which illustrate the operations performed by the method 400. Those of ordinary skill in the art will appreciate how to use the techniques illustrated by FIGS. 4–5 to process a memory write request.

In the example illustrated in FIGS. 5A–5B, the CPU 104a in cell board 102a issues a memory read request 502 to the memory controller 110a over the system bus 108, in the manner described above with respect to FIG. 2 (step 402). Assume for purposes of example that the memory locations specified by the read request 502 are not in the main memory 112a in cell board 102a.

Memory controller 110a receives the read request 502 and determines that the requested memory is not in the onboard memory 112a. The memory controller 110a therefore transmits a memory read request 504 to the fabric agent chip 114a so that the original read request 502 may be satisfied by reading from memory in one of the other cell boards 102b–d (step 404).

The read request 504 is intercepted by the codec engine 320a. In the example illustrated in FIGS. 5A–5B, the codec engine 320a only compresses and decompresses the data portion of messages containing read or write data. Because the read request 504 is a memory access request and does not include any read or write data, the codec engine 320a forwards the read request 504 to the fabric agent chip 114a without compressing or decompressing the read request 504 (step 406).

In response to receiving the read request 504, the fabric agent chip 114a in the cell board 102a transmits a read request 506 to the crossbar switch 116 requesting the same memory locations requested by the read request 504, as described above with respect to FIG. 2 (step 408). In response to receiving the read request 506, the crossbar switch 116 determines which of the cell boards 102b–d should receive the read request 506, and forwards the read request 506 to the appropriate cell board (step 410). In the present example, assume that the cell board 102d includes the memory addressed by the read request 506 and that the crossbar switch 116 therefore forwards the read request 506 to cell board 102d.

Cell board 102d includes fabric agent chip 114d, which receives the read request 506 from the crossbar switch 116d. The fabric agent chip 114d translates the memory addresses in read request 506 back into the global virtual address space and generates an appropriate read request 507 (step 412). The read request 507 is received by codec engine 320d, which forwards the read request 507 to memory controller 110d without compressing or decompressing any portion of read request 507 (step 414).

Memory controller 110d reads data 508 from the memory locations addressed by read request 508 in memory 112d (step 416). The read data 508 may, for example, include one or more pages of memory data.

The memory controller 110d transmits read data 508 in a message 510 including both a header portion 512 and a data portion 514 that includes the read data 508 (step 418). The use of messages including headers and data portions is well-known to those of ordinary skill in the art and was omitted from the description of FIG. 2, above, for ease of illustration and explanation.

The message 510 is received by codec engine 320d, which compresses the read data 508 in the data portion 514 of the message 510 (step 420). The codec engine 320d generates a message 516 that includes both the header 512 and a data portion 518 including the read data 508 in compressed form (step 422). The codec engine 320d may use any kind of data compression to produce the compressed read data 518, such as an of the LZW family of compression algorithms (e.g., LZ1, LZ77, LZ78), run-length encoding (e.g., Huffman coding, arithmetic coding).

The message 516 is received by the fabric agent chip 114d, which translates the memory addresses referenced in the header 512 into memory addresses in the address space used by the crossbar switch 116. The fabric agent chip 114d generates a message 520 including a header 522 that uses the translated addresses and a data portion 518 including the compressed form of the read data 508. The fabric agent chip 114 transmits the message 520 to the fabric agent chip 114a over the crossbar switch 116 (step 424). The fabric agent chip 114a translates the memory addresses in header 522 back into addresses in the global virtual address space, and generates a message 524 including header 512 and data portion 518 including the compressed form of the read data 508. Fabric agent chip 114a transmits the message 524 to the codec engine 320a (step 426), which decompresses the data portion 518 of the message 524 (step 428) and generates a message 526 including header 512 and data portion 514 including the (uncompressed) read data 508.

The codec engine 320a transmits the message 526 to the memory controller 110a (step 430), which extracts and transmits the read data 508 to the CPU 104a (step 432). The read data 508 is thereby received by the CPU 104a (step 434) in response to the initial read request 502 in a manner that is indistinguishable (from the point of view of the CPU 104a) from a read request satisfied directly from the local onboard memory 112a.

Among the advantages of embodiments of the present invention are one or more of the following.

As described above, there is a need to increase the bandwidth of the system fabric in multiprocessor computer systems as processor speed continues to increase relative to system fabric bandwidth. Techniques disclosed herein may be used to achieve an effective increase in system fabric bandwidth without increasing the actual (hardware) bandwidth of the crossbar switch 116 itself. In particular, data may be transmitted more quickly over the crossbar switch 116 by compressing the data before it is transmitted. Such compression may produce an effective increase in bandwidth so long as the transmitting codec engine and receiving codec engine are capable of compressing and decompressing the transmitted data sufficiently rapidly.

In addition to enabling the crossbar switch 116 to carry inter-system traffic without bottlenecking, the use of data compression/decompression may result in better performance by applications executing on the computer system 300. For example, database applications, web server applications, and other applications that frequently access large blocks of memory are particularly susceptible to performance gains resulting from use of the techniques disclosed herein.

The system 300 may be designed based on a prior art system (such as the system 100 shown in FIG. 1) by designing the codec engines 320a–d and adding the codec engines 320a–d to the cell boards 102a–d. Although the codec engines 320a–d are shown as separate components in FIG. 3, the codec engines 320a–d may be integrated into the fabric agent chips 114a–d, respectively, in which case the system 300 may be designed by redesigning the fabric agent chips 114a–d to incorporate the codec engines 320a–d, respectively. The system 300 may then be implemented by replacing the fabric agent chips 114a–d with the new fabric agent chips containing the codec engines 320a–d.

Because the codec engines 320a–d are integrated into the operation of the fabric agent chips 114a–d, the compression and decompression performed by the codec engines 320a–d is transparent to the other components of the system 300. The memory controller 110a and crossbar 116, for example, may process messages transmitted to and received from the fabric agent chip 114a in the same manner as in the prior art, even when the codec engine 320a is installed in the system 300.

The techniques disclosed above therefore provide several advantages over techniques that require redesigning and replacing the crossbar switch 116 and other elements of the system fabric to achieve higher intra-system bandwidth. For example, redesigning and replacing the memory controller 110a and/or crossbar switch 116 can be costly and time-consuming in comparison to redesigning and replacing the fabric agent chips 114a–d. In addition, the fabric agent chips 114a–d may be replaced without requiring any other components of the system 100 to be redesigned or replaced. In contrast, redesigning and replacing the crossbar switch 116 often requires the fabric agent chips 114a–d and possibly the power supply, cooling system, and physical form factor of the system 100 to be redesigned and/or replaced.

Solutions which merely require replacing the fabric agent chips 114a–d may therefore be implemented relatively easily, at relatively low cost, and without requiring other components of the system 100 to be replaced. In particular, consider a case in which the CPUs 104a–n in the system 100 are replaced with a subsequent generation of faster CPUs. As a result of the introduction of such CPUs, the existing crossbar 116 may become unable to provide sufficient intra-system bandwidth for the CPUs 104a–n to operate at their maximum speed. In such a case, the crossbar 116 is typically redesigned and replaced to provide additional bandwidth. Using the techniques disclosed herein, however, sufficient intra-system bandwidth may be maintained by redesigning and replacing the fabric agent chips 114a–d, while retaining the existing crossbar switch 116. The ability to retain the existing crossbar switch 116, even for one additional generation of CPUs, may provide significant advantages in terms of reduced design time and cost when designing a system including the next generation of CPUs.

As mentioned above, the codec engine 320a may use any of a variety of compression schemes to compress and decompress data. Although the particular desired compression ratio may vary from case to case, even a relatively small average compression ratio (e.g., 25%) may produce significantly increased performance, measured in terms of the effective bandwidth of the crossbar switch 116 and the system fabric more generally. Various compression algorithms are well-known in the art which are capable of consistently achieving such compression ratios for data having typical characteristics, and which may be implemented relatively simply and inexpensively.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Although various embodiments of the present invention are described herein in conjunction with symmetric multiprocessor computer architectures (SMPs), embodiments of the present invention are not limited to use in conjunction with SMPs. Embodiments of the present invention may, for example, be used in conjunction with NUMA (non-uniform memory access) multiprocessor computer architectures.

Although four cell boards 102a–d are shown in FIG. 3, this is not a requirement of the present invention. Rather, the techniques disclosed herein may be used in conjunction with multiprocessor computer systems having any number of cell boards. Furthermore, each cell board in the system may have any number of processors (including one). The term "cell board" as used herein is not limited to any particular kind of cell board, but rather refers generally to any set of electrical and/or mechanical components that allow a set of one or more processors to communicate over a system fabric through an interface such as an agent chip.

Although the system 300 in FIG. 3 includes crossbar switch 116 for switching messages among the cell boards 102a–d, the techniques disclosed herein may be used in conjunction with system fabrics utilizing communications means other than crossbar switches. For example, two or more cell boards may be interconnected by a bus rather than a crossbar switch.

The fabric agent chips 114a–d and codec engines 320a–d may be implemented in any of a variety of ways, such as in custom-designed analog and/or digital circuitry, ASICs (application-specific integrated circuits), FPGAs (field-programmable gate arrays), or any combination thereof.

What is claimed is:

1. A computer system comprising:
   a system fabric;
   a plurality of cell boards connected to the system fabric, each of the plurality of cell boards comprising:
      at least one microprocessor;
      a memory;
      a memory controller coupled between the memory and the at least one microprocessor;
      a fabric agent chip coupled between the memory controller and the system fabric; and
      a compression/decompression (codec) engine coupled between the memory controller and the fabric agent chip to compress data received from the memory controller and to decompress data received from the fabric agent chip.

2. The computer system of claim 1, wherein the system fabric comprises a crossbar switch.

3. The computer system of claim 1, wherein the system fabric comprises a bus.

4. The computer system of claim 1, wherein each of the plurality of cell boards includes a plurality of processors.

5. The computer system of claim 1, wherein the codec engine in each of the plurality of cell boards comprises:
   means for compressing data transmitted by the memory controller to the fabric agent chip; and
   means for decompressing data transmitted by the fabric agent chip to the memory controller.

6. The computer system of claim 1 wherein the fabric agent chip includes the codec engine.

7. A computer system comprising:
   a system fabric;
   a plurality of cell boards, each of the plurality of cell boards comprising:
      at least one processor;
      a memory;
      memory control means, coupled between the memory and the at least one microprocessor, for controlling communication between the at least one processor and the memory;
      communication means, coupled between the memory control means and the system fabric, for controlling communication between the memory control means and the system fabric; and
      compression/decompression means, coupled between the memory control means and the communication means, for decompressing communications received by the communication means over the system fabric and for compressing communications transmitted by the communication means over the system fabric.

8. The computer system of claim 7, wherein each of the plurality of cell boards includes a plurality of processors.

9. The computer system of claim 7, wherein the compression/decompression means in at least one of the plurality of cell boards comprises:
   means for compressing data transmitted by the memory control means to the communication means; and
   means for decompressing data transmitted by the communication means to the memory control means.

10. The computer system of claim 7, wherein the communication means includes the compression/decompression means.

11. A method comprising:
   (A) obtaining data from a first memory controller in a multiprocessor computer system;
   (B) compressing the data to produce compressed data; and
   (C) transmitting the compressed data over a system fabric in the multiprocessor computer system.

12. The method of claim 11, wherein the step (C) is performed by a fabric agent chip in the multiprocessor computer system.

13. The method of claim 11, wherein the step (B) is performed by a fabric agent chip in the multiprocessor computer system.

14. The method of claim 11, further comprising a step of:
   (D) decompressing the compressed data to produce the data obtained from the first memory controller.

15. The method of claim 14, further comprising a step of:
   (E) providing the data obtained from the first memory controller to a second memory controller in response to a first memory read request issued by the second memory controller.

16. The method of claim 15, further comprising a step of:
   (F) providing the data obtained from the first memory controller to a microprocessor in response to a second memory read request issued by the microprocessor.

17. The method of claim 15, further comprising a step of:
   (F) storing the data obtained from the first memory controller in a memory controlled by the second memory controller.

18. The method of claim 11, wherein the system fabric comprises a crossbar switch.

19. The method of claim 11, wherein the system fabric comprises a bus.

20. An apparatus comprising:
   means for obtaining data from a first memory controller in a multiprocessor computer system;
   compression means for compressing the data to produce compressed data; and
   transmission means for transmitting the compressed data over a system fabric in the multiprocessor computer system.

21. The apparatus of claim 20, wherein the transmission means comprises a fabric agent chip.

22. The apparatus of claim 20, wherein the compression means comprises a fabric agent chip.

23. The apparatus of claim 20, further comprising:
   decompression means for decompressing the compressed data to produce the data obtained from the first memory controller.

24. The apparatus of claim 23, further comprising:
   means for providing the data obtained from the first memory controller to a second memory controller in response to a first memory read request issued by the second memory controller.

25. The apparatus of claim 24, further comprising:
   means for providing the data obtained from the first memory controller to a microprocessor in response to a second memory read request issued by the microprocessor.

26. The apparatus of claim 24, further comprising:
   means for storing the data obtained from the first memory controller in a memory controlled by the second memory controller.

* * * * *